United States Patent [19]

Failla et al.

[11] Patent Number: 4,898,135
[45] Date of Patent: Feb. 6, 1990

[54] PISTON AND PROCESS FOR ACHIEVING CONTROLLED IGNITION AND COMBUSTION OF HYDROCARBON FUELS IN INTERNAL COMBUSTION ENGINES BY GENERATION AND MANAGEMENT OF FUEL RADICAL SPECIES

[75] Inventors: Charles C. Failla, Annapolis; Andrew A. Pouring, Edgewater; Bruce Rankin, Annapolis, all of Md.; Carlo L. di Priolo, Milan, Italy; William McCowan, Grasonville; Dennis Gosewisch, Severna Park, both of Md.

[73] Assignee: Sonex Research, Inc., Annapolis, Md.
[21] Appl. No.: 311,289
[22] Filed: Feb. 16, 1989
[51] Int. Cl.[4] .............................................. F02F 3/28
[52] U.S. Cl. .................................. 123/263; 123/279; 123/193 P
[58] Field of Search .................. 123/193 P, 263, 276, 123/279, 256; 92/213, 268, 224

[56] References Cited

U.S. PATENT DOCUMENTS

| | | |
|---|---|---|
| 1,803,263 | 4/1931 | Lang . |
| 1,944,352 | 1/1934 | Lang . |
| 2,076,030 | 4/1937 | Kahllenberger . |
| 2,505,999 | 5/1950 | Smith . |
| 2,827,033 | 3/1958 | Bodine, Jr. . |
| 2,966,145 | 12/1960 | Froehlich . |
| 3,177,861 | 4/1965 | Quillian, Jr. . |
| 3,283,751 | 11/1966 | Goossak et al. . |
| 3,386,421 | 6/1968 | Hoffmann et al. . |
| 3,897,769 | 8/1975 | Jozlin . |
| 4,002,151 | 1/1977 | Toyoda et al. . |
| 4,023,541 | 5/1977 | Sakamoto et al. . |
| 4,060,059 | 11/1977 | Blaser . |
| 4,104,989 | 8/1978 | Resler, Jr. . |
| 4,105,009 | 8/1978 | Resler, Jr. . |
| 4,128,092 | 12/1978 | Yokota et al. . |
| 4,164,913 | 8/1979 | Komiyama et al. ............ 123/193 P |
| 4,253,430 | 3/1981 | Garter et al. .................... 123/193 P |
| 4,317,432 | 3/1982 | Noguchi et al. . |
| 4,522,173 | 6/1985 | Agache . |
| 4,535,683 | 8/1985 | Dworak et al. ................. 123/193 P |
| 4,538,566 | 9/1985 | Tsuruoka ........................ 123/193 P |
| 4,566,413 | 1/1986 | Maly . |
| 4,572,123 | 2/1986 | Evans . |
| 4,592,318 | 6/1986 | Pouring . |
| 4,686,941 | 8/1987 | Ariga . |
| 4,779,587 | 10/1988 | Schweinzer et al. . |
| 4,788,942 | 12/1988 | Pouring . |

FOREIGN PATENT DOCUMENTS

| | | |
|---|---|---|
| 2114901 | 9/1972 | Fed. Rep. of Germany . |
| 1613767 | 9/1941 | Japan . |
| 61-190153 | 8/1986 | Japan . |
| 62-75022 | 4/1987 | Japan . |
| 787697 | 12/1980 | U.S.S.R. . |
| 861681 | 9/1981 | U.S.S.R. . |
| 1081362 | 3/1984 | U.S.S.R. . |
| 351633 | 7/1931 | United Kingdom . |

OTHER PUBLICATIONS

SAE Tech. Paper #790501, Feb. 1979, Onishi et al.
SAE Tech. Paper #790840, Sep. 1979, Noguchi et al.

Primary Examiner—Willis R. Wolfe
Assistant Examiner—M. Macy
Attorney, Agent, or Firm—Bacon & Thomas

[57] ABSTRACT

A piston for a reciprocating piston internal combustion engine is provided with a reaction chamber (44, 144) communicating with a recessed area (42, 142) of the piston through a restricted continuous slot orifice (46, 146) that is configured to create a choked fluid flow condition between the combustion chamber (30, 130) and the reaction chamber at all engine operating speeds. Fuel is supplied to the reaction chamber and undergoes a controlled, cold frame reaction process while in intimate contact with the crown portion (54) of the piston (14). The reaction produces fuel radicals in sufficient quantity to seed subsequent fuel charges to properly condition the charge for predetermined desired ignition and combustion characteristics. The choking orifice (46, 146) ensures that outward flow of radicals from the reaction chamber is controlled to the extent that they will be maintained in the combustion chamber following an exhaust event of the combustion cycle so they will be available during a subsequent compression stroke of the piston for seeding the subsequent charge. The radical population in the subsequent charge conditions the charge to obtain dependable and predictable ignition in a compression ignition engine as well as knock free combustion at relatively lean air to fuel ratios in a spark ignited engine.

17 Claims, 6 Drawing Sheets

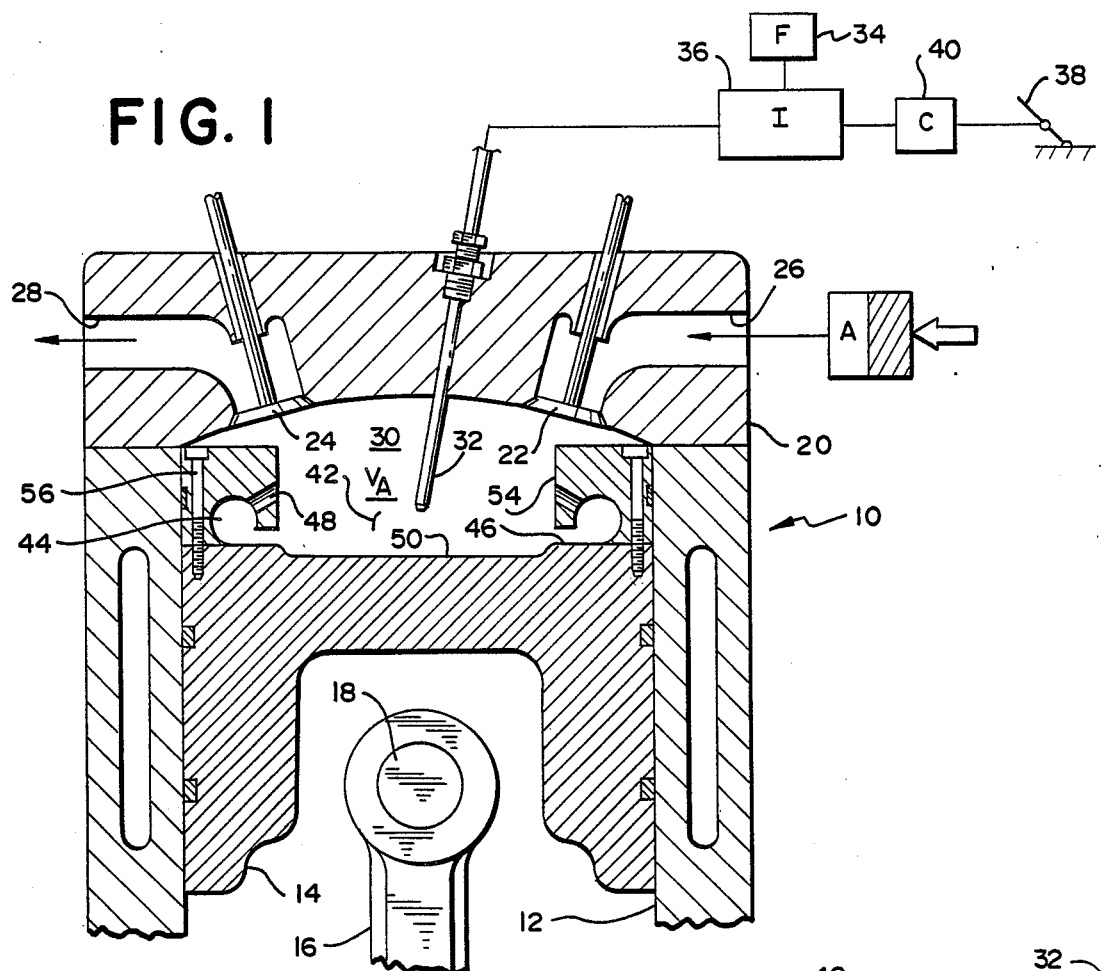
FIG. 1
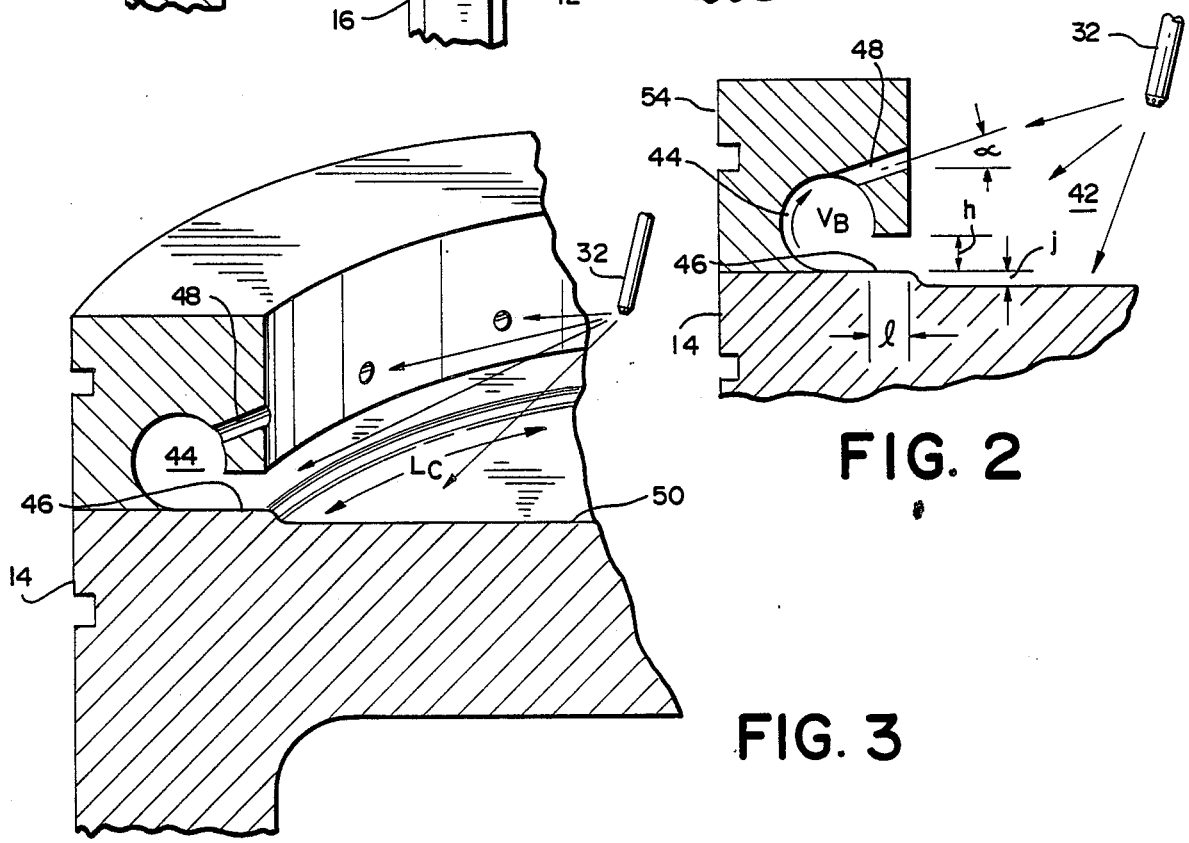
FIG. 2
FIG. 3

PISTON AND PROCESS FOR ACHIEVING CONTROLLED IGNITION AND COMBUSTION OF HYDROCARBON FUELS IN INTERNAL COMBUSTION ENGINES BY GENERATION AND MANAGEMENT OF FUEL RADICAL SPECIES

FIELD OF THE INVENTION

This invention is in the field of internal combustion engines and in particular pistons for such engines.

BACKGROUND OF THE INVENTION AND DISCUSSION OF RELATED TECHNOLOGY

Improved control over the ignition and combustion characteristics of a fuel charge in an internal combustion (I.C.) engine has been a long sought goal. In diesel (compression ignition or C.I.) engines, problems associated with dependably igniting a typical diesel oil fuel are well known and have been extensively documented, particularly in connection with high speed automobile and truck diesel engines. Also extensively documented, particularly in recent times, are problems associated with smoke and particulate exhaust emissions which are also related to ignition characteristics of diesel fuel.

It is also recognized that alcohol fuels that might be regarded as appropriate, at least in a marginal sense, in conventional spark ignited (S.I.) engines, are regarded as difficult or inappropriate fuels for diesel engines due to their high heat of vaporization (resulting in excessive cooling effects in the combustion chambers) and their low cetane numbers (resulting in difficult or undependable compression ignition due to excessive ignition delay).

In the case of S.I. engines, it has been recognized that the combustion of gasoline type fuels at compression ratios conventionally used in modern engines is limited by the knocking tendency of the fuels. Antiknock additives, of course, are commonly used, as are alcohol blends to reduce the knock tendency of gasoline fuels. It is highly desirable to obtain clean, complete combustion of gasoline type fuels without knock at all operating regimes of S.I. engines.

Various approaches to improve ignition characteristics of fuels in diesel engines have met with mixed degrees of success, but the particulate emission problem with conventional diesel fuels and ignition problems with alcohol fuels remain difficult if not seemingly impossible to solve without substantial modification to the conventional diesel engine, and without substantial treatment of the fuel or exhaust stream.

Also, as indicated previously, various approaches have been taken to improve the antiknock characteristics of gasoline fuels for S.I. engines, all of which generally require additives to the fuel, which increases the cost of producing the fuel product.

On the other hand, interesting recent developments in the field of combustion technology, as well as certain older discoveries in combustion related disciplines, in particular, the importance of chemical activity leading up to the oxidation reaction of fuel substances in air at elevated temperatures and pressures, as well as of the physical environment needed for producing dependable spontaneous ignition of diesel fuels and knock-free combustion of gasoline fuels, have led to investigations by the inventors of the role of radical species of hydrocarbon liquid fuels in the complex process of ignition and combustion of fuels in C.I. and S.I. internal combustion engines.

The present invention arises from the recognition that controlled seeding of a fuel charge before ignition in a C.I. or S.I. engine with highly active radical species of fuel generated in a cool flame process (i.e., partial cool flame oxidation reaction) can produce dependable and predictable ignition and knock free combustion of fuels normally considered difficult to ignite without ignition improvers (in the case of a C.I. engine) or subject to knock during certain engine operating conditions (in the case of S.I. engines), due to the chemical conditioning of the compressed fuel charge. Indeed, it must be recognized that the entire process of ignition and combustion of a hydrocarbon fuel is a chemical exothermic reaction involving rapid oxidation of fuel to produce heat and expansion energy that is harnessed effectively to produce motive force. Any process that chemically optimizes the reaction will inherently improve the ignition and combustion characteristics of the fuel and improve engine operation and exhaust emission characteristics due to better and more complete combustion. Undue complication of the engine or its combustion chamber, or the handling of the fuel/air supply and the exhaust stream will also be avoided.

The problem is how to generate and manage the supply of radicals in the combustion chamber to achieve the recognized benefits that can be obtained from such seeding. Generation of radicals per se is relatively simple: heat an air and fuel mixture at elevated temperature and pressure so that it "cooks" or partially reacts in a cool flame oxidation process to produce various highly active radical species of the fuel and oxygen which will readily combine chemically with other molecules and radical species. However, what is complicated is introducing a suitable quantity of such radical species into a fuel charge within a closed combustion chamber in an engine in an efficient yet effective manner with minimum complexity and alteration of the existing engine and its combustion chamber. In the case of a C.I. engine, the required quantity of radicals is that population of radicals in a given fuel charge for a given engine that will produce a desired preselected ignition characteristic. For example, the characteristic may be dependable ignition timing of a low cetane fuel at a relatively low compression ratio, or it may be cleaner combustion of a higher cetane fuel with minimum smoke and particulate emissions. In the case of an S.I. engine, the required quantity of radicals is that population required to achieve complete, very rapid combustion of a fuel charge without premature ignition of end gases normally at the end regions of the combustion chamber reached lastly by the combustion flame front. As is well known, such premature ignition results in a sudden reaction producing a very rapid and often destructive pressure rise in the combustion chamber with audible noise known as "knock".

Various approaches taken in this regard are described in U.S. Pat. No. 4,002,151 granted Jan. 11, 1977 and U.S. Pat. No. 4,317,432 granted Mar. 2, 1982, both of which are incorporated herein by reference for their descriptions of problems to be solved in this field, the mechanisms and chemistry for radical generation by partial oxidation reaction of fuel and air, the composition of radicals resulting from such reactions, the influence of radicals as ignition centers in combustion of liquid fuels in internal combustion engines, and the relationship between the self-ignition point of fuels and the temperature and pressure conditions in the combustion zone (i.e., see FIG. 5 of U.S. Pat. No. 4,317,432).

Another approach to generating and managing radicals to improve combustion of hydrocarbon fuels (i.e., "radical enhanced combustion") is disclosed in U.S. Pat. No. 4,592,318 granted Jun. 3, 1986 and assigned to the assignee of this invention. This patent is also incorporated herein by reference for its discussion of the significance of radical seeding of a fuel charge and the influence of radicals on the autoignition point of fuels under variable temperature and pressure conditions as investigated and reported by N. N. Seminov (i.e. see FIG. 14 of the patent and the related discussion).

In this U.S. Pat. No. (4,592,318) it is recognized that fuel radical species can be generated in a controlled manner in a resonating chamber provided in the outer periphery of a piston, wherein the chamber is isolated from a main combustion chamber except for a critical gap or slot orifice that produces a resonating condition that pumps air into the main combustion zone, and which may also produce a choked flow of fluid from the resonating chamber into the combustion zone at the moment of opening of the exhaust valve at the end of the expansion portion of the cycle. The gap is also disclosed in the patent as providing a choked flow condition into the resonating chamber during the compression part of the cycle at least at higher engine operating speeds to thereby produce a variable compression ratio for the engine, dependent upon engine speed.

While the apparatus and process described in U.S. Pat. No. 4,592,318 achieved its intended purpose, namely clean, complete combustion of fuel without undesirable emissions, and while the apparatus reduced the knock tendency of engines incorporating the described combustion system, it has now been discovered that, for ceratin engines, dependable ignition and combustion characteristics can be achieved by utilizing a secondary chamber that communicates with the main combustion chamber through an orifice that is substantially choked at all operating speeds of the engine. Moreover, the importance of retaining radicals in the secondary chamber beyond the exhaust portion of the combustion cycle and the importance of providing a bowl or recess in the piston for containing most of the fuel of the charge was not recognized in the context of improving ignition characteristics of diesel fuels in C.I. engines and obtaining rapid, complete combustion without knocking in S.I. engines.

BRIEF SUMMARY OF THE INVENTION

The present invention comprises a piston, and combustion chamber for a piston type, air breathing internal combustion engine that is intended to generate and manage fuel radical species to obtain predetermined fuel ignition and combustion characteristics that, in the case of a C.I. engine will result in dependable timed ignition of each fuel charge and ignition delay characteristics that reduce smoke and particulate emissions from diesel cycle engines. In the case of a S.I. engine, the invention produces rapid knock free combustion of a fuel charge at very lean air to fuel ratios.

The controlled generation of radicals and their timed release into the combustion chamber in sufficient quantity to seed each incoming charge to obtain the desired charge ignition characteristic is achieved by using a generally toroidal or toroidal section shaped reaction chamber disposed closely adjacent a deep bowl or recess in the piston crown area and communicating with the recess through a narrow slot orifice arranged to produce intense vortical swirling of the mixture while it is in intimate contact with the chamber sidewalls, quenching of flame propagation through the orifice from the main combustion chamber and choked flow of gases into and out of the reaction chamber during engine operation so that a time lag exists between the pressure fluctuations in the reaction chamber and pressure fluctuations in the combustion chamber. This arrangement produces controlled pressure, temperature and fuel mixture conditions in the reaction chamber and an adequate supply of fuel radicals to the combustion chamber during the intake and compression portions of each combustion cycle.

In a C.I. engine embodiment, during each combustion cycle, a quantity of fuel is admitted into the reaction chamber, preferably by directing a direct injected fuel spray at the slot orifice so that fuel flows into the reaction chamber. Alternatively, the fuel can be entrained in aspirated air during the intake portion of the combustion cycle of the engine and transferred to the reaction chamber during compression of the charge. The air and fuel in the reaction chamber are partially reacted at high temperature and pressure by undergoing a cool flame oxidation process that produces highly reactive and unstable radical species of fuel and oxygen. The mixture in the reaction chamber is swirled intensively so that it maintains close contact with the sidewalls of the chamber so that heat transfer is achieved from the piston crown into the fluid mixture in the reaction chamber. A portion of the radicals are then supplied in a controlled manner to the piston recess area of the combustion chamber during the intake and compression events of the combustion cycle, where they function to seed the primary air and fuel charge in sufficient quantity to obtain the desired fuel ignition and combustion characteristics.

In C.I. engines, the invention enables dependable ignition and combustion of low cetane number fuels, such as methanol, at normal compression ratios without using ignition improvers, and also provides benefits in reducing smoke and particulate emissions resulting from burning oil diesel fuels by modifying the pressure rise or heat release rate in the combustion chamber following ignition. The combustion of methanol fuels, for example, is improved in that the combustion process is carried out more as a single phase burning process with less ignition delay rather than diffusion burning. The pressure rise is lower and combustion is completed close to the piston top dead center position instead of later in the cycle, as is typical in convention diesel cycle engines.

Ignition delay of diesel fuels in C.I., direct injected engines is controlled or optimized using the invention by varying the timing of fuel injection. Upon each injection, the fuel sees certain pressure and temperature conditions in the combustion chamber, but also encounters a highly active radical population in a fuel rich area of the piston recess that instantaneously causes chemical activity leading up to the production of numerous ignition centers throughout the compressed charge of fuel and air. The point at which the ignition centers will ignite can be regulated by controlling the population of radicals in the charge as well as the general location and distribution of the radical population in the combustion chamber. Using the invention, relatively lower compression ratios (i.e., 18:1) can be used to achieve dependable compression ignition of low cetane fuels such as methanol (having cetane numbers ranging from about 5 to about 10).

In S.I. engines the invention enables efficient, rapid and complete combustion of fuel charges on the lean side of stoichiometric without knock at all operating regimes of an engine. Undesirable emissions are reduced due to the clean combustion of the fuel charge at reduced temperature and pressure and improved economy is obtained without significant loss of power.

DESCRIPTION OF THE DRAWINGS

With reference to the appended drawings:

FIG. 1 schematically illustrates a vertical cross-sectional view of the combustion chamber area of a compression-ignition internal combustion engine incorporating a preferred embodiment of the invention;

FIG. 2 is a detailed view of a section of piston crown incorporating the reaction chamber in accordance with the preferred embodiment of the invention illustrated in FIG. 1;

FIG. 3 shows an enlarged section of a piston crown area incorporating a reaction chamber incorporating an embodiment of the invention illustrated in FIG. 1;

DETAILED DESCRIPTION OF PREFERRED EMBODIMENTS

Figure 4:
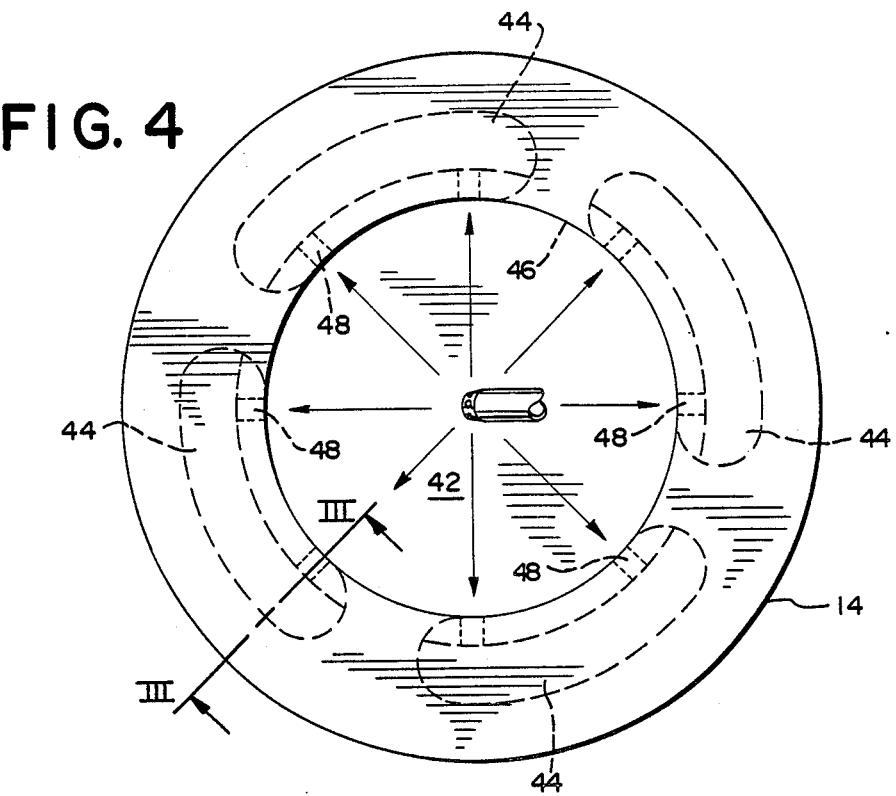
FIG. 4 schematically illustrates a plan view of a piston crown area incorporating a different preferred embodiment of the invention useful for a C.I. engine.
Figure 5:
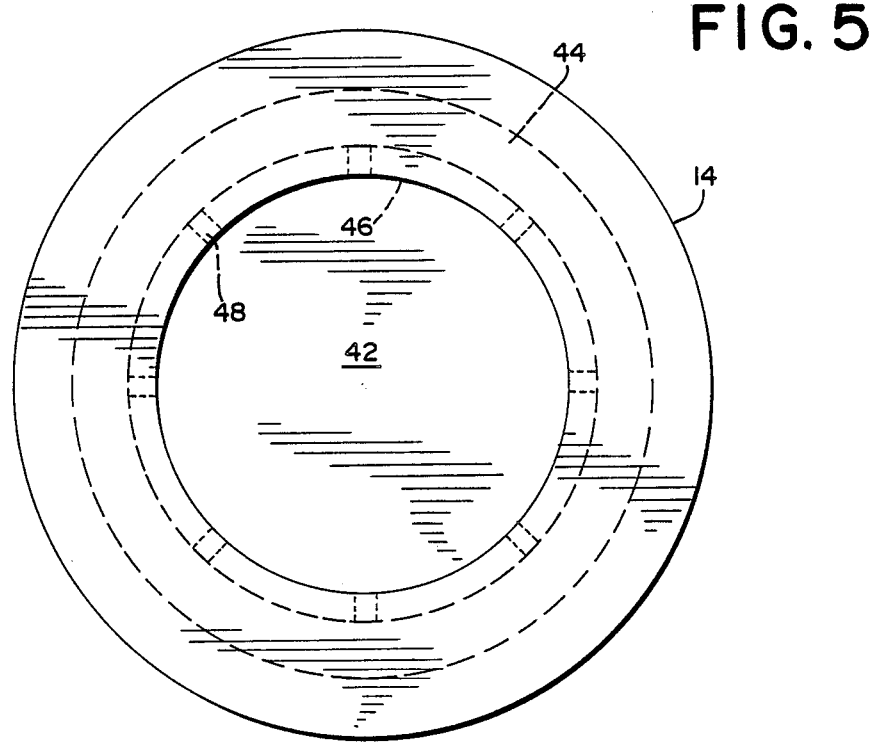
FIG. 5 is similar to FIG. 4, showing another preferred embodiment of the invention useful for a C.I. engine.

With reference to FIGS. 1-3, an internal combustion, direct injected compression-ignition (C.I.) engine 10 is schematically illustrated in cross-section, wherein a cylinder 12 contains a reciprocating piston 14 connected to an output crank shaft (not illustrated) via connecting rod 16 attached to piston 14 by wrist pin or gudgeon 18. Cylinder 12 is closed at its top end by a cylinder head 20 to provide a combustion chamber clearance volume $V_c$ between the upper end of the piston 14 and the head 20.

Conventional intake and exhaust valves 22, 24 provide communication between intake and exhaust ports 26, 28 and the combustion chamber, generally designated at 30. Valves 22, 24 may be actuated by any conventional system commonly used for such purposes in internal combustion engine technology and it is assumed that a person skilled in the art of modern internal combustion engines will be familiar with valve drive train technology which provides synchronized opening and closing of the valves 22, 24 to enable at least air to be drawn into the combustion chamber through air cleaner A and compressed during the intake and compression portion of the combustion cycle through intake port 26, the combustion and expansion of a charge in a closed combustion chamber, and the discharge of combustion products through exhaust port 28 during the exhaust portion of the combustion cycle of the engine. The fuel, typically, is directly injected into the combustion chamber, although in a S.I. engine it could be aspirated with the air in the manner to be described below.

In the specific C.I. engine embodiment illustrated in FIG. 1-6, the fuel portion of the charge is admitted into the combustion chamber 30 by a direct fuel injection nozzle 32 which receives fuel from a supply 34 via an injector pump system 36 under the control of an accelerator pedal 38 through a control module 40 and injects it directly into the combustion chamber in a spray pattern as the piston approaches TDC during the compression portion of the combustion cycle. Any appropriate fuel injector system can be used in connection with the present invention, and it is assumed that a person skilled in the art of fuel injection systems for internal combustion engine technology will be familiar with systems and components that can provide timed injection of fuel into the combustion chamber of the engine in synchronism with the combustion cycle under the control of a "throttle" or accelerator pedal 38, whereby an appropriate supply of fuel/air charge is provided to the combustion chamber 30 near the end of the compression portion of the combustion cycle and continuing usually over the piston TDC portion and into the expansion portion.

In the illustrated example of FIG. 1, the combustion of the charge is initiated solely as a result of the charge being subjected to elevated pressure and temperature conditions whereby spontaneous ignition of the charge occurs. In typical fashion, a glow plug (not illustrated) may be utilized to initiate combustion during startup of the engine.

While only a fuel injector system is illustrated, and is preferred in the described embodiment, it is to be understood that the fuel could be aspirated as a vapor and the supply could be timed and stratified to ensure that a sufficient quantity of fuel was admitted to the reaction chamber to produce fuel radical species in accordance with the objectives of this invention.

As stated at the outset of this description, radicals in the combustion chamber provide ignition centers for the fuel charge, permitting optimized ignition and combustion of diesel oil fuels, dependable ignition of low cetane fuels, such as methanol and knock free combustion of gasoline fuels. While it has been recognized in the prior art that the utilization of radicals to enhance combustion can be carried out by utilizing separate radical production chambers or chambers that are separated from the combustion chamber, the previous technology has failed to provide a simple system for dependably supplying radicals to charge each combustion cycle in sufficient quantity to dependably improve the ignition and combustion characteristics of the fuels used in C.I. and S.I. engines. It is particularly difficult to seed a charge supplied to an I.C. engine with an adequate supply of radicals for each combustion cycle when the source of the radicals is itself contained within the combustion chamber area. Thus, in accordance with the invention it is proposed to utilize a reaction chamber in communication with the main combustion chamber where fuel and air of the charge undergo partial oxidation reaction to produce fuel radical species and in which a high radical population can be maintained for eventual seeding into the charge of a next succeeding combustion cycle. A particular problem to be overcome is the retention of sufficient radicals beyond the exhaust portion of each combustion cycle so that a next succeeding charge can be adequately and dependably seeded to obtain the desired ignition and combustion characteristics of the fuel. In accordance with this invention, it has been discovered that this result can be achieved when the reaction chamber is separated from the main combustion chamber by a critical size orifice that results in a choked flow condition of compressible gases between the reaction chamber and the main combustion chamber of the engine during all engine operating speeds. This produces a lag between the pressure fluctuations within the reaction chamber and the pressure fluctuations within the main combustion chamber to the extent that radicals are retained in the reaction chamber beyond the expansion and exhaust events of each combustion cycle and are available for seeding the charge during the intake and compression events of such succeeding cycle.

The benefits to be realized from radical seeding of each charge include, as indicated previously, improved ignition characteristics of low cetane fuels, reduction of smoke produced during combustion of diesel fuels in C.I. engines, and knock free combustion of gasoline fuels in S.I. engines. The reduction of smoke is achieved by igniting more effectively all portions of the injected charge, particularly the extremely lean region which normally goes unburned, and the smoke reduction is also accompanied by a reduction of unburned hydrocarbons and carbon monoxide. Knock-free combustion is achieved by the effected seeding of the entire charge with ignition centers that avoid end gas reactions, and promote rapid, complete combustion of leaner than normal charges.

In accordance with the present invention, in the embodiments of FIGS. 1–6, piston 14 is provided with a recess 42 in its crown area that is intended to represent a substantial proportion of the volume $V_A$ of combustion chamber 30. Volume $V_A$ here is defined as the total clearance volume ($V_C$) in the combustion chamber 30 where piston 14 is at top dead center (TDC) minus the volume ($V_B$) of reaction chamber 44 (including the slot and discrete orifice areas). A fuel injector 32 is arranged to discharge fuel in a spray pattern into the recess area 42 whereby, near initiation of spontaneous combustion, recess 42 contains most of the fuel portion of each charge in the combustion chamber volume $V_A$.

It is to be understood that the configuration of the closed end of cylinder 12 as defined by the head 20 may vary from that which is illustrated in FIG. 1. For example, while FIG. 1 illustrates an arched or domed combustion chamber, a relatively flat or slightly arched top end of the combustion chamber could be provided, in which case, the volume of recess 42 could represent a larger share of the combustion chamber volume $V_A$.

An essential feature of the invention is the provision of a generally toroidal or toroidal segment shaped reaction chamber 44 surrounding or partially surrounding the periphery of recess 42 in the crown area of piston 14. Reaction chamber 44 communicates with recess 42 through a continuous slot orifice 46 and, optionally, one or more smaller auxiliary discrete orifices 48.

While the reaction chamber 44 illustrated in FIG. 1 is fully toroidal and extends circumferentially entirely around the periphery of recess 42, it should be understood that in some preferred embodiments, it is desirable to limit the circumferential extent of reaction chamber 44 so that it only extends part way around the crown of the piston or extends as separate chambers spaced around the periphery of recess 42. For example, as shown in FIG. 4, reaction chamber 44 could exist as four separate volumes spaced peripherally around recess 42, each volume having substantially the same or different cross sectional configurations and the same or different continuous slot and discrete orifice configurations. The considerations that will determine the choice of reaction chamber locations along with the choice of other variables of slot and discrete orifice size and locations, reaction chamber volume, orifice lengths, cross sectional area and various other dimensions and shapes will be discussed in more detail below.

It should be noted in the embodiment illustrated in FIG. 1, and as illustrated in more detail in FIGS. 2 and 3, reaction chamber 44 has a volume $V_B$ (which is intended to include the volumes of the orifices 46 and 48) and it has been observed that the relationship between $V_A$ and $V_B$ can be important in some engine configurations. It is believed presently that the invention is best embodied in typical automotive and truck engines when the relationship between $V_A$ and $V_B$ satisfies the formula:

$$\frac{V_B}{V_A} = .020 - .200 \tag{1}$$

The slot orifice 46 communicates tangentially with one side of chamber 44 whereby incoming fluid is caused to radially vortically spin or swirl within reaction chamber 44, i.e. as illustrated by the arrow in FIG. 2. Thus, an incoming fluid stream directed into chamber 44 will radially swirl in a direction tending to retain the fluid components within the chamber, particularly since the direction of spin tends to sweep the rotating fluid stream past the inlet slot orifice 46 parallel to and in the same direction as the incoming stream so that the rotating fluid stream within the chamber 44 tends to join the incoming fluid stream, whereby the entire mass of gas is intimately mixed and caused to maintain close contact with the interior walls of chamber 44 through centrifugal forces so that good heat transfer between the piston crown and the swirling fluid is obtained.

The smaller discrete orifices 48 are preferred only for direct injected, C.I. engines and preferably communicate diametrically with chamber 44 as shown, or they likewise may be configured to enter the chamber 44 somewhat tangentially similar to the slot orifice 46 to cause radial swirling or spinning of gases or liquids admitted through the discrete orifices into chamber 44. While slot orifice 46 has been discussed in connection with the admission of gases, it should be understood that it is contemplated that liquid components of the injected fuel also may be incorporated in a stream of fluid directed into chamber 44 through slot 46 during the compression portion of each combustion cycle.

It has been observed from experiments that the reaction chamber 44 should be disposed closely adjacent the periphery of recess 42 and it is highly desirable that some of the fuel injected by injector 32 reach the slot orifice 46 substantially directly in liquid form to ensure that a portion of the unreacted fuel charge is admitted into reaction chamber 44 during the compression portion of each combustion cycle. Moreover, it has been observed that the slot orifice 46 should be located closer to the bottom of recess 42 than the top, depending upon the specific combustion chamber configuration in which the reaction chamber is utilized. Preferably, the orifice 46 is located within the lower half of the vertical height of recess 42, since it has been observed experimentally that the desired results from the invention are best attained in this region.

The discrete orifices 48, moreover, may constitute circular orifices communicating via channels with reaction chamber 44, with the channels inclined at an angle relative to horizontal which corresponds with the angle of impingement of liquid fuel from injector 32. The diameter and inclination of the orifices 48 preferably are arranged such that a controlled amount of liquid fuel impinging against the orifices 48 from injector 32 will be conveyed to chamber 44.

In all embodiments of the invention, slot orifice 46 is configured to have a length L whereby an advancing combustion flame front in combustion chamber 30 is effectively quenched before reaching chamber 44. The length of the slot orifice 46 will thereby be selected in accordance with the relationship between the maximum temperature (T) and maximum pressure (P) within combustion chamber 30 during a combustion cycle that will satisfy the formula:

$$L \propto \frac{(k)T^{\frac{1}{2}}}{P} \quad (2)$$

where:
L = is the length of the continuous slot orifice between the recess 42 and reaction chamber 44.
k = a constant.
T = combustion chamber maximum temperature.
P = combustion chamber maximum pressure.

It is also important, in accordance with all embodiments of the present invention, that the cross sectional area of the continuous slot orifice 46, (as defined by the slot circumferential length ($L_C$) and slot height (h) is such that, during all operating regimes of the engine, a choked flow condition occurs across the slot orifice between reaction chamber 44 and combustion chamber 30 both during the compression portion of the combustion cycle and during the expansion/exhaust portions of the cycle so that a time lag exists between the pressure fluctuations in the combustion chamber and in the reaction chamber, with the latter lagging behind the former. Specifically, it is well known that any pressure ratio ($P_B/P_A$) equal to or less than the critical ratio of about 0.53 across a typical slot orifice 46 (ignoring for the moment any discrete orifice 48) will result in a choked flow condition through the slot orifice in accordance with classical compressible fluid mechanics. Thus, during the compression portion of a combustion cycle, gases at increasingly higher pressure in combustion chamber 30 attempting to reach $V_B$ in reaction chamber 44 through slot orifice 46 would flow progressively faster through the slot orifice until, at a critical pressure ratio of about 0.53, a choked condition is reached, at which time the pressure ratio would increase across the slot and the corresponding rate of flow through would be limited according to the laws of classical fluid mechanics. This condition would last until the pressure in chamber 46 increased to the point that the pressure ratio across slot 46 dropped below the critical choked condition and eventually the pressures between the combustion chamber 30 and reaction chamber 44 would be equalized by flow through the slot orifice. In accordance with the present invention, it is intended that the cross sectional area of slot orifice 46 be dimensioned such that, at all operating speeds of the engine (i.e. all piston velocities), a choked condition will occur due to the pressure differentials applied across slot orifice 46 during at least the compression portion of each combustion cycle and also at least during the expansion/exhaust portion of each cycle so that a supply of radicals is assured during a compression event following completion of the exhaust part of the cycle. The reasons for desiring such choked conditions will become evident during the discussion of the invention that follows.

It is to be noted that the choked condition that exists across slot orifice 46 is also desired across any smaller discrete orifices 48 as well and it should be understood that the choked condition of flow between combustion chamber 30 and reaction chamber 44 will occur periodically at substantially all operating speeds of the engine even if both slot orifice 46 and discrete orifices 48 are provided.

Preferably, a slot orifice height h (see FIG. 2) of 0.010-0.100 in. (0.254-2.54 mm) has been found to be practical for typical C.I. and S.I. automotive and truck engines. It is possible that larger displacement engines would require using a larger slot height h, provided that the choked condition previously mentioned is maintained. The slot height h is an important dimension, and will vary from engine to engine and piston to piston, since each combustion chamber configuration will have varying dimensions that will require "tuning" the slot height h to achieve flame quenching and choked flow conditions required to achieve the proper generation, retention and outflow of radicals within and from chamber 44. Thus, formulas (1) and (2) expressed above, and formula (3) expressed below describe certain dimensional and functional relationships that must exist to achieve the invention, and the slot height h will be selected for any particular combustion chamber configuration within the dimensional range expressed above.

As stated at the outset, an essential objective of the invention is the generation and partial retention in reaction chamber 44 of partially reacted radical species of fuel between combustion cycles with controlled sustained outflow of sufficient radicals from the chamber 44 into the recess area 42 required for conditioning the next succeeding charge so that, for example, in a C.I. engine, dependable, consistent initiation of smoke-free combustion will occur each combustion cycle of the engine, and, in a S.I. engine, knock free combustion is achieved.

More specifically, in accordance with this invention, the relationship between the outflow of radicals from the reaction chamber, the rate of generation of radicals within the chamber, the rate of radical inflow into the chamber from the combustion chamber and the rate of radicals retained in the reaction chamber are in accordance with the following formula:

$$R_{out} = R_{gen.} + R_{in} - R_{ret.} \geq R_{crit.} \quad (3)$$

where:
$R_{out}$ = radicals discharged from the reaction chamber into the piston recess;
$R_{gen.}$ = radicals generated during each combustion cycle in the reaction chamber;
$R_{in}$ = seeded radicals from the combustion chamber returned to the reaction chamber during compression of the seeded charge;
$R_{ret.}$ = radicals retained in the reaction chamber each combustion cycle;

$R_{crit.}$ = the minimum population of radical species in the reaction chamber required to consistently seed a charge in the combustion chamber during each combustion cycle so as to obtain a preselected ignition and combustion characteristic of the charge for a given engine.

It is to be kept in mind that an overall objective of the invention for a C.I. engine is to seed the incoming charge so that an effective concentration or population of radical species will be present in the combustion chamber, in particular in the recess area 42 of the piston, so that initiation of ignition of the fuel charge, including low cetane fuels at normal compression ratios, will occur in a predictable, dependable manner. It is assumed, of course, that an appropriate physical environment, including pressure and temperature conditions, for initiating ignition will be present in the combustion chamber by selection of an appropriate compression ratio, materials of construction and cooling system. However, the benefits of the invention are that dependable, consistent compression-ignition can be achieved with various fuels, including those having a low cetane value, by radical seeding of the charge.

The above formula (3) indicates that the production of radicals and the seeding of the incoming charge for each combustion cycle must be equal to or exceed that rate sufficient to initiate combustion in the main combustion chamber 30 consistently and reliably, and/or to enable knock free combustion of gasoline fuels in a S.I. engine. Of course, the absolute amount of radical production in chamber 44 will vary for each engine depending on the fuel used, compression ratio, operating conditions and other variables associated with operation of each engine. However, it can always be determined experimentally utilizing the principles described herein what the critical rate ($R_{crit}$) of production of radicals in the chamber 44 must be to achieve adequate conditioning (i.e., seeding) of the charge in the combustion chamber to obtain such consistent and reliable spontaneous ignition in C.I. engines or knock free combustion in S.I. engines.

From the formula (3), it will be seen that the quantity of radicals generated within chamber 44 plus the quantity of radicals readmitted into the chamber with the current charge undergoing compression, less the quantity of radicals retained within chamber 44 during the current combustion cycle, must equal or exceed that critical quantity of radicals that will be available in chamber 44 for eventual discharge through continuous slot orifice 46 and, if present, discrete orifices 48. The discharge occurs substantially under choked flow conditions starting during the expansion portion of the combustion cycle when the pressure in the combustion chamber 30 drops below the pressure in the reaction chamber 44 with the critical pressure ratio existing across the continuous slot and discrete orifices 46, 48. The discharge continues through the exhaust event under choked flow conditions until the beginning of the intake portion of the cycle so that a time lag exists between the pressure fluctuations within the combustion chamber 30 and the reaction chamber 44. This ensures that the discharge of radicals from chamber 44 will continue past the expansion and exhaust portions of the combustion cycle and continue into the intake portion and preferably the compression portion of the combustion cycle involving the next succeeding charge. This ensures a supply of sufficient quantity of radicals into combustion chamber 30 to obtain the desired ignition and combustion characteristics of the charge undergoing compression in both C.I. and S.I. engines. Where the charge undergoing compression may not receive the fuel portion of the charge until late during the compression portion of the cycle, for example when the fuel is directly injected into the combustion chamber, radical seeding of the air portion of charge early during the intake and compression events will achieve the desired results, since the desired radical population will be present in the combustion zone at the moment of injection of the fuel.

It is important to note that radical species of fuel produced as a result of pre-flame or cool flame reaction (i.e., "pre-combustion" radicals) are important for seeding an incoming charge to obtain the desired reliable ignition and combustion characteristics sought by the invention. The presence of various products of oxidation reaction of fuels following combustion and left over following the exhaust portion of the combustion cycle are of lesser importance in conditioning a fuel charge for a dependable and controllable ignition point. Therefore, it is important in accordance with the invention that pre-combustion radicals be generated, preserved and controllably supplied to the combustion chamber in accordance with the aforesaid formula (3). Sufficient radicals must be produced and made available to the combustion zone each combustion cycle to ensure the achievement of the desired ignition and/or combustion characteristics of the charge for any engine. This is achieved in accordance with the invention by providing the reaction chamber 44 adjacent a piston recess 42 and communicating with the piston recess within the lower region thereof in such a manner that the choked flow condition occurs across the communicating slot and orifices 48 to both retain a quantity of pre-combustion fuel radicals and to supply a critical quantity of the radicals to the combustion zone in a succeeding combustion cycle under controlled conditions.

While it has been determined experimentally that the presence of the continuous slot orifice within the lower half of the recess 42 is important, it is believed that the distance j between the continuous slot orifice 46 and the bottom 50 of the recess 42 may be significant for some engine configurations where temperature effects, turbulence and similar factors affecting combustion might need to be considered. Likewise, the configuration of the bottom 50 of the recess 42 may vary from engine to engine to ensure predictable commingling of radicals with incoming charge between combustion cycles.

Various alternative configurations of the continuous slot orifice for a C.I. engine (direct injected) are illustrated in FIGS. 6(a-e) and which are considered to be exemplary only, since each configuration will produce its own particular result in terms of radical generation, fuel presence in the reaction chamber and output of radicals for the next succeeding combustion cycle.

Figure 6A:
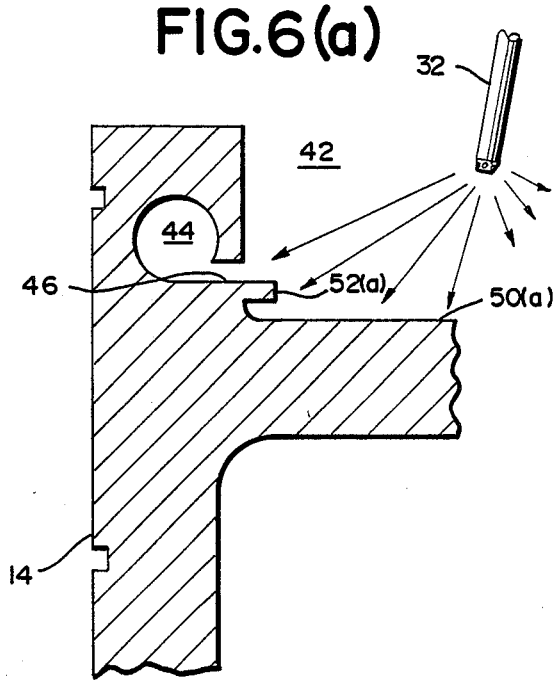
FIGS. 6 (a-e) schematically illustrate various other preferred embodiments of the invention as incorporated in a piston crown area of a direct injected engine.
Figure 6B:
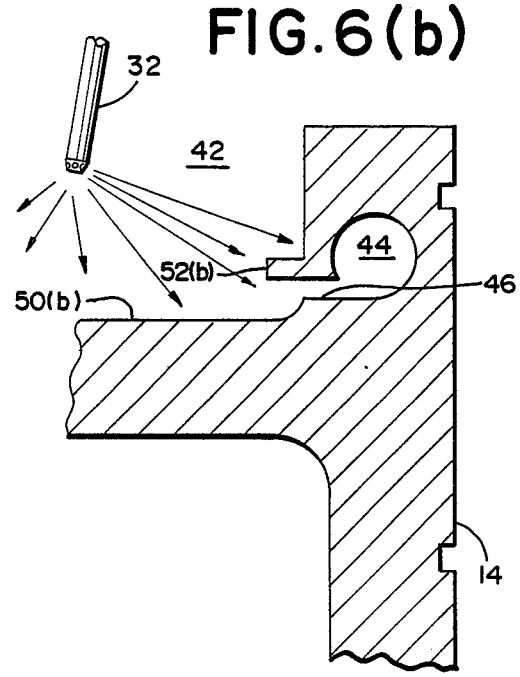
Figure 6C:
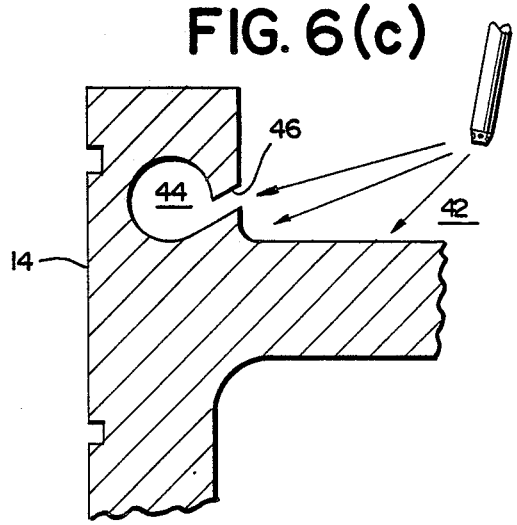
Figure 6D:
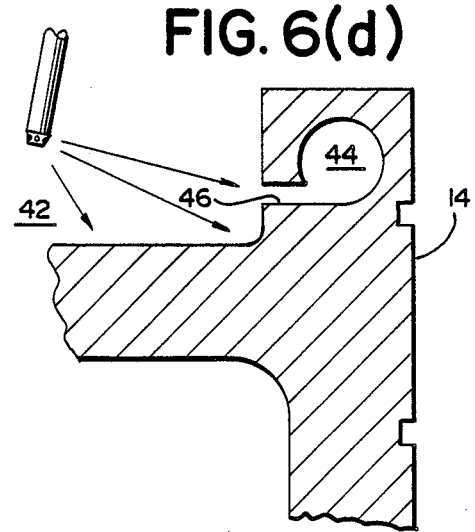
Figure 6E:
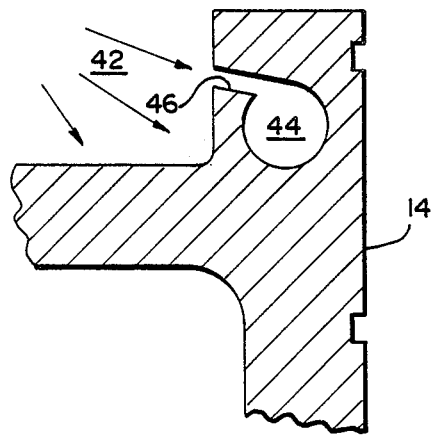

As shown in FIGS. 6(a) and 6(b), where like reference numerals represent common elements illustrated in FIGS. 1-5, a shield projection 52(a) and 52(b) may be provided below or above the entrance to the slot orifice 46 to control the admission of liquid fuel into reaction chamber 44 and to somewhat shield or lengthen the entrance to the slot orifice 46, depending upon the requirements of a particular engine configuration to ensure the results required in accordance with formula (3). It will be noted that in FIG. 6(a) and 6(b), the bottom of recess 42 is configured slightly differently, and may be either lower or higher than the location illustrated relative to slot orifice 46 depending on the requirements of a specific combustion chamber configuration. Likewise, slot orifice 46 may be disposed higher or lower within recess 42, depending upon the requirements of formula (3) for any particular engine, including the location of spray patterns projected by fuel injector 32.

In FIG. 6(c–e), various orientations and locations of slot orifice 46 are illustrated to show how adjustments can be made between the location of reaction chamber 44 and its associated slot orifice 46 in various engine configurations. Of course, the various embodiments illustrated in FIGS. 6(a–e) could be used in a S.I. engine if desired.

It is believed that a continuous slot orifice as illustrated at 46 is preferable to a series of independent smaller orifices 48 for the management of fuel radicals discharged into the recess area 42 between combustion cycles and also for the purpose of achieving better control over the quantity of fuel admitted into reaction chamber 44. Thus, a continuous slot orifice 46 appears to be more desirable and is preferred in accordance with experimental results thus far observed, while smaller auxiliary orifices 48 may be desirable and preferred to accommodate various engine configurations in order to achieve the results desired in accordance with formula (3).

The characteristics of reaction chamber 44 i.e., surface materials and thermal conductivity of the piston crown structure defining the chamber as well as shape and size of the chamber all should be optimized for any given engine and combustion chamber configuration. Essential to carrying out the invention is the optimization of the partial oxidation reaction process of the fuel, which is usually a liquid hydrocarbon, ranging from diesel oil, a low cetane fuel such as methanol having a cetane number generally not exceeding 10, and gasoline. Clearly, rapid chemical reaction within chamber 44 must be promoted by the choice of shape, size and materials of the reaction chamber, and likewise of the communicating orifices, if present. For example, a catalytic coating on the surfaces of reaction chamber 44, including a carbon coating, can be used to promote the partial oxidation reaction of the fuel admitted to the combustion chamber of the engine to promote the rapid generation of radicals within the chamber 44 for any given engine.

Figure 7:
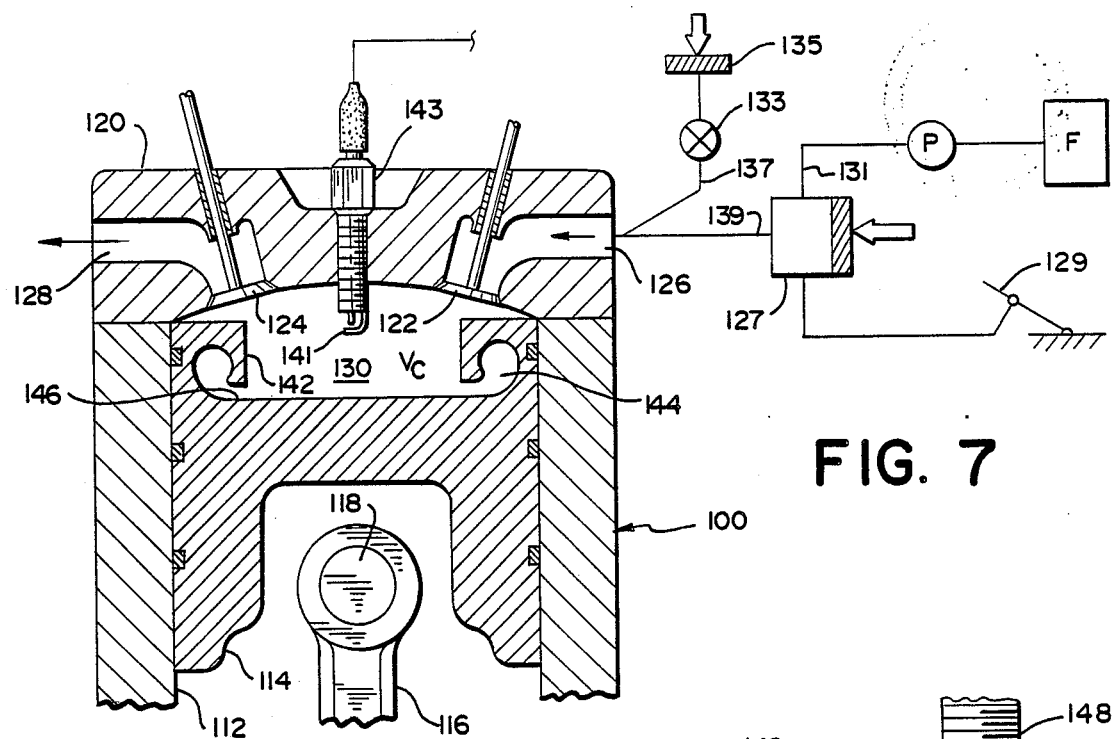
FIG. 7 is an embodiment of the invention shown used in a S.I. engine.

In the embodiment of FIG. 1 of the invention, it is to be noted that the reaction chamber 44 is defined by a crown segment 54 manufactured as a separate piece from the piston proper 14. The crown segment 54 may be secured to piston 14, for example, by means of a fastener as illustrated at 56. This would enable the invention to be carried out using materials for crown segment 54 that are different from the lower piston body 14 to thereby gain advantages in control over the thermal characteristics of crown segment 54. Moreover, an advantage would be gained in manufacturing and/or coating chamber 44 where piston crown segment 54 was formed as a separate element. However, the illustrated embodiment is provided by way of example only and is not considered to define a limiting feature of the present invention. For example, the crown 54 could be integral with piston 14, if desired, as illustrated in FIG. 7.

FIGS. 7–10 illustrate the invention in the context of an S.I. engine generally denoted by the reference numeral 100. Engine 100, like engine 10 described above, includes a cylinder 112 which contains a reciprocating piston 114 connected to an output crankshaft (not illustrated) via connecting rod 116 attached to piston 114 by wrist pin or gudgeon 118. The cylinder 112 is closed at its top end by a cylinder head 120 to provide a combustion chamber clearance volume $V_C$ between the upper end of piston 114 and the head 120.

Intake and exhaust valves 122, 124 provide communication between intake and exhaust ports 126, 128 and the combustion chamber, in this instance generally designated at 130. Valves 122 and 124 may be actuated by any conventional system commonly used for such purposes in internal combustion engine technology.

In the specific S.I. engine embodiment illustrated in FIGS. 7–10, air and fuel are aspirated through a carburetor 127, which may contain a throttle valve (not illustrated) under the control of a manually operable throttle element 129. Fuel supplied through the fuel supply F is transported to the carburetor 127 via Pump and fuel line 131.

Each charge is stratified within the combustion chamber 130 preferably by using a secondary air valve 133 which admits air through intake cleaner 135 and duct 137 into the intake manifold 139 adjacent the intake valve 122. Secondary air valve 133 may comprise a simple flapper valve that admits air into the intake port 126 immediately upstream of the intake valve 122 towards the end of each intake event so that a very lean mixture is provided upstream of the intake valve 122 when the valve closes. Upon opening of the valve during the next intake event, a very lean mixture is aspirated into the combustion chamber 130 before the fuel enriched portion reaches the chamber via the carburetor 127. In this manner, stratification of the charge within combustion chamber 130 can be achieved, whereby, at the conclusion of the compression stroke, a relatively lean charge can be provided closer to the bottom of the combustion chamber 130, while a relatively rich portion of the charge lies adjacent the ignition point 141 of spark igniter 143.

The operating cycle of S.I. engine 100 normally includes intake, compression, combustion, expansion and exhaust events as are conventionally known. In a 4 stroke cycle, motion of piston 114 downwardly aspirates a fuel air charge through intake valve 122, while the next upward stroke of the piston 114 compresses the charge within the combustion chamber 130. The charge is ignited by suitable activation of spark plug 143 to cause combustion and expansion of the reacting charge within the combustion chamber 130 to drive piston 114 downwardly to produce rotary output energy through connecting rod 116. The next upward stroke of the piston 114 causes exhaust of spent products of combustion through exhaust valve 124 and exhaust port 128. The combustion cycle then begins anew.

Piston 114 is provided with a recess 142 in its crown area that is intended to represent a substantial portion of the volume $V_A$ of combustion chamber 130, where $V_A$ corresponds to volume $V_A$ described above in connection with the embodiment of the invention illustrated in FIG. 1. Also provided adjacent the crown area of the piston 114 is a reaction chamber 144 which corresponds essentially with the reaction chamber 44 illustrated in the embodiment according to FIG. 1. The reaction chamber 144 communicates with the recess 142 through a continuous slot orifice 146, which is essentially configured in accordance with the considerations described above in connection with the embodiment of FIG. 1, including the choked flow conditions at all engine operating speeds. Thus, the aforesaid formulas (1), (2) and (3) all apply with respect to the reaction chamber 144 and the slot orifice 146 and flow to and from chamber 144 is choked during at least compression, expansion and exhaust events occurring during the combustion cycle. Reaction chamber 144 is also configured in accordance with the FIG. 1 embodiment insofar as its cross sectional configuration is concerned, whereby vortical radial swirling of a fluid mixture admitted into the chamber 144 via slot orifice 146 is induced to promote intimate thermal contact with the sidewalls of the reaction chamber 144.

Figure 8:
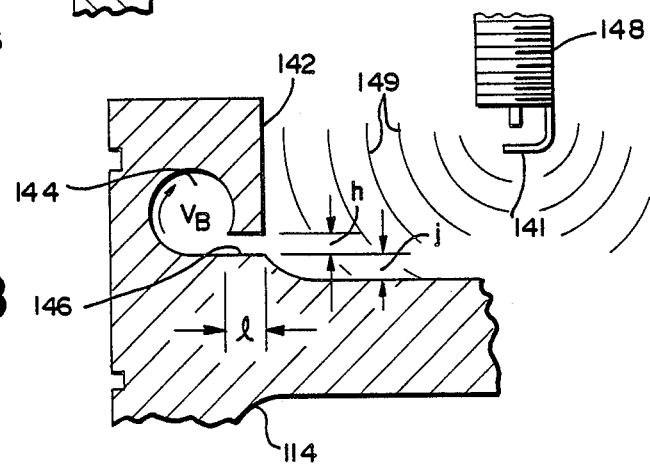
FIG. 8 is a detailed view of a section of a piston crown incorporating the reaction chamber in accordance with the embodiment of the invention illustrated in FIG. 7.

As illustrated in more detail in FIG. 8, it will be noted that the slot orifice 146 is disposed towards the bottom of the recess 142 where it might be expected that the end gases of a charge would be located and in the area that is last reached by a combustion flame front generally indicated by the lines 149. It has been observed that for S.I. engines, rapid, clean combustion of each charge is achieved by radical seeding of the charge, whereby multiple ignition centers are provided throughout the charge which promote very rapid combustion of the fuel without sudden explosive reaction of end gases that are reached lastly by a combustion flame front. Thus, the radical seeding prevents rapid pressure and temperature rise in the combustion end zones so that combustion knock is avoided. It is also theorized that, since all of the charge is seeded with radicals, including the end gases, essentially the entire charge begins reacting virtually instantaneously following charge ignition by spark igniter 143, so that no end gases rich in uncombusted fuel exist within the combustion chamber towards the end of each combustion event.

Thus, in accordance with formula (2), the combustion flame front is quenched before it enters the reaction chamber 144 so no flame combustion occurs in the reaction chamber, and, in accordance with formula (3), an adequate supply of radicals produced in chamber 144 is available at the beginning of each compression event. That is, a minimum population of radical species is provided in the charge within the combustion chamber during each combustion cycle so as to obtain a preselected combustion characteristic of the charge; namely, complete clean combustion of the fuel without knock. The radical seeding furthermore permits combustion of very lean charges without significant loss of power and without knock.

Figure 9:
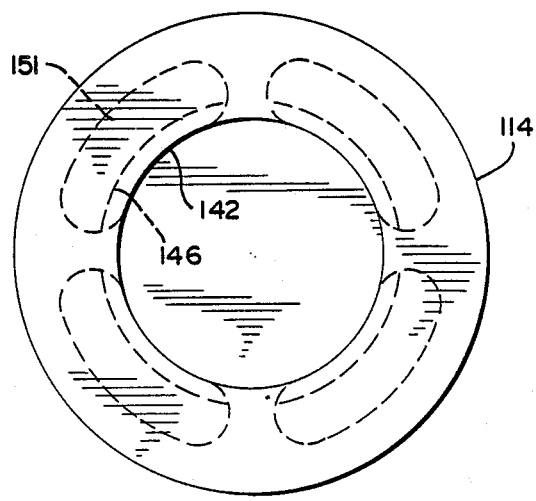
FIGS. 9 and 10 are plan views of a piston crown area incorporating embodiments of the invention useful for S.I. engines.
Figure 10:
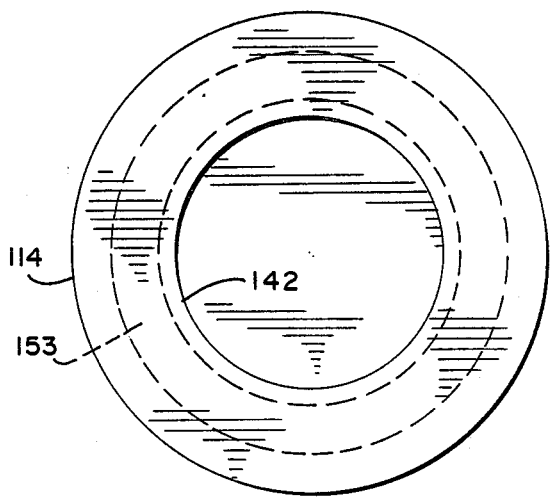

In FIGS. 9 and 10, plan views of alternate embodiments of the piston 114 are illustrated, wherein, in FIG. 9, the reaction chamber illustrated at 151 is discontinuous and circumferentially located about the periphery of recess 142. In FIG. 10, the reaction chamber 153 is located continuously and circumferentially around the recess 142 in piston 114. Of course, other embodiments can be envisioned, depending upon the particular engine involved, and whereby the relationships indicated in formulas (1), (2) and (3) can be established and maintained.

It is to be noted that in the embodiment of the S.I. engine illustrated in FIGS. 7-10, discrete orifices corresponding with those illustrated at 48 in FIG. 1 are usually not required, since no direct injection of liquid fuel is involved in a typical S.I. engine. However, it should be noted that, where direct injection of a gasoline fuel is involved, it might be desirable to provide discrete orifices corresponding to those illustrated at 48 in FIG. 1 in the piston recess 142 of the embodiment according to FIG. 7.

It will be also noted in FIG. 7 that the crown of piston 114 is illustrated as being constructed integral with the piston proper instead of as a separate element as illustrated in FIG. 1, although the crown could be constructed in accordance with FIG. 1 if desired, that is as a two piece assembly.

It has been determined from experimental observation that clean, complete combustion of gasoline fuels at air/ratios of up to 29:1 can be achieved at compression ratios of approximately 8:1 without knock and without significant loss of power. Such results are believed to be attributable to the benefits obtained by radical seeding each charge to a sufficient extent that spontaneous combustion of end gases in advance of the approaching flame front in the combustion chamber is avoided so that knock free combustion is assured at air fuel ratios considerably leaner than stoichiometric.

It is to be understood that the description and illustrations herein provided are to be considered as exemplary only and are not to be considered as limiting the scope of the invention for which protection is sought to anything less than the full legal scope of the claims that follow.

We claim:

1. In a piston for a reciprocating piston internal combustion engine in which a combustion cycle is carried out in a variable volume combustion chamber defined by the piston reciprocating in a close ended cylinder into which a fuel and air charge is periodically supplied, and which cycle includes intake, compression, combustion, expansion and exhaust portions, and wherein the piston crown is recessed and contains the majority of the charge when the combustion chamber is at minimum volume, the improvement comprising:

said piston including a generally toroidal shaped reaction chamber disposed in the piston crown area adjacent the periphery of the recess and extending at least part way around the recess periphery, and a continuous slot orifice providing communication between the recess and the reaction chamber, said reaction chamber and slot orifice being shaped and dimensioned such that during the compression part of each combustion cycle, a portion of the charge is admitted tangentially into the reaction chamber through the slot orifice with the flow of the gas portion of the charge being choked substantially during the entire compression event; the fluid admitted to the reaction chamber is radially vortically swirled in intimate contact with the sidewalls of the reaction chamber so as to effect heat transfer to the admitted charge and its partial oxidation reaction to create radical species of the fuel; any flame front approaching the reaction chamber from the combustion chamber is quenched; and outward flow of compressed gas with radicals from the reaction chamber into the combustion chamber during each combustion cycle through the slot orifice is choked during at least the expansion and exhaust portions of each combustion cycle; and so that radicals of the fuel are produced and retained temporarily in the reaction chamber during the combustion, expansion and exhaust portions of a combustion cycle and are discharged into the piston recess following the conclusion of said exhaust portion at least in advance of the compression portion of the next succeeding combustion cycle in sufficient quantity to condition the next succeeding charge in the combustion chamber for preselected ignition and combustion characteristics.

2. The improvement as claimed in claim 1 including a fuel injector arranged to directly inject liquid fuel into the piston recess and also into the reaction chamber via the slot orifice.

3. The improvement as claimed in claim 2 including at least one auxiliary discrete orifice arranged to provide communication between the combustion chamber and the reaction chamber, and wherein the fuel injector is arranged to also inject a part of the fuel directly into the reaction chamber via the discrete orifice during each combustion cycle, said discrete orifice also being dimensioned and configured so as to quench any flame approaching the reaction chamber from the combustion chamber and to obtain said choked flow of gas with radicals from the reaction chamber into the combustion chamber during the expansion, exhaust and compression portions of each combustion cycle.

4. The improvement as claimed in any one of claims 1 to 3 wherein the slot orifice is disposed within the lower half of the piston recess.

5. The improvement as claimed in claim 2, including an overhanging projection above the slot orifice disposed between the fuel injector and the slot orifice.

6. The improvement as claimed in claim 2, including an overhanging projection disposed beneath the entrance to the slot orifice and disposed between the fuel injector and the bottom of the piston recess.

7. The improvement as claimed in claim 3, including an inclined channel providing communication between said at least one auxiliary discrete orifice and said reaction chamber, the angle of inclination of said channel corresponding to the angle of impingement of fuel from said fuel injector.

8. The improvement as claimed in claim 1, including a charge inlet valve, a charge preparation means upstream of the inlet valve, and spark ignition means in the combustion chamber.

9. The improvement as claimed in claim 8, wherein the charge is aspirated and including means for stratifying each charge within the combustion chamber so that a richer mixture is present adjacent the spark igniter than adjacent the piston at the end of each compression event.

10. The improvement as claimed in any one of claims 1 to 3 or 5 to 8 including means for carrying out the generation of radical species in the reaction chamber during each combustion cycle in accordance with the formula:

$$R_{out} = R_{gen.} + R_{in} - R_{ret.} \geq R_{crit.}$$

where:
$R_{out}$ = radical species discharged from the reaction chamber into the piston recess;
$R_{gen.}$ = radical species generated during each combustion cycle in the reaction chamber;
$R_{in}$ = seeded radicals from the combustion chamber returned to the reaction chamber during the compression of the seeded charge;
$R_{ret.}$ = radicals retained in the reaction chamber each combustion cycle;
$R_{crit.}$ = the minimum quantity of radical species in the reaction chamber required to consistently seed a charge in the combustion chamber each combustion cycle so as to obtain desired preselected ignition and combustion characteristics of the charge.

11. The improvement as claimed in claim 10, wherein the desired preselected ignition characteristic comprises compression ignition of the charge at a consistent predictable time during each combustion cycle.

12. The improvement as claimed in claim 1 wherein said slot orifice has a transverse height of 0.010-0.100 inches (0.254-2.54 mm) and a radial length related to the maximum temperature and maximum pressure of combustion in the combustion chamber according to the formula:

$$L \propto \frac{(k)T^{\frac{1}{2}}}{P}$$

where:
L is the slot radial length;
k is a constant;
T is the maximum combustion temperature;
P is the maximum combustion pressure;
whereby said quenching and choked flow conditions are optimized.

13. The improvement as claimed in claim 1 wherein the relationship between reaction chamber volume ($V_B$) and combustion chamber volume ($V_A$) is in accordance with the formula:

$$\frac{V_B}{V_A} = 0.02 \text{ to } .200.$$

where $V_A$ = total combustion chamber clearance volume at piston TDC, minus $V_B$.

14. A process of radical seeding of a charge in a combustion chamber of an air breathing reciprocating piston type internal combustion engine including a piston having a recess area at its crown and a fuel supply system arranged to supply fuel into the combustion chamber to carry out a combustion cycle including intake, compression, combustion, expansion and exhaust portions comprising:

providing a generally toroidal shaped reaction chamber in the piston crown area adjacent the periphery of the recess and extending at least part way around the outer periphery of the recess area;

providing the reaction chamber with a continuous slot orifice directed tangentially towards one side of the chamber and curved inner sidewalls so that a radial vortical flow is induced in the reaction chamber when fluid flows into the reaction chamber from the recess area during each compression stroke of the piston, with the vortical flow arranged so as to retain the fluid in the reaction chamber;

selecting slot orifice dimensions, configuration and location such that combustion flames from the combustion chamber are quenched by the slot orifice before they can extend into the reaction chamber and such that inflow and outflow of compressible gases to and from the reaction chamber from and to the recess area are choked due to differential pressure conditions existing across the slot orifice during part of the expansion, exhaust and compression portions of each combustion cycle, so that the pressure fluctuations in the reaction chamber always lag behind the pressure fluctuations in the combustion chamber and so that radicals generated in the reaction chamber during a combustion cycle are partially retained in the reaction chamber during the combustion, expansion and exhaust portions of the combustion cycle and are partially discharged into the recess area near the start of the compression portion of the next succeeding combustion cycle;

carrying out each combustion cycle by directing at least a portion of the fuel for each cycle with air into the reaction chamber and partially reacting the fuel with air in the reaction chamber while the mixture is vortically swirled in intimate contact with the chamber sidewalls, and by discharging a portion of the radicals generated in the reaction chamber into the bottom lower half of the recess area under the choked outflow conditions recited in the previous step;

carrying out the generation of radicals in the reaction chamber and controlling the generation of radicals within the reaction chamber in accordance with the formula:

$$R_{out} = R_{gen.} + R_{in} - R_{ret.} \geq R_{crit.}$$

where:

$R_{out}$ = radicals discharged from the reaction chamber into the piston recess area;

$R_{gen.}$ = radicals generated during each combustion cycle in the reaction chamber;

$R_{in}$ = seeded radicals returned to the reaction chamber from the combustion chamber during compression of a charge;

$R_{ret.}$ = radicals retained in the reaction chamber;

$R_{crit.}$ = the minimum quantity of radical species of fuel in the reaction chamber required to obtain preselected ignition and combustion characteristics of the charge each combustion cycle.

15. The process as claimed in claim 14, wherein the fuel is directly injected as liquid into the recess area of the piston, the combustion portion of each combustion cycle is initiated by compression ignition, and wherein the preselected ignition characteristics comprise consistent, predictable ignition timing each combustion cycle.

16. The process as claimed in claim 14, wherein the process is carried out using compression ignition of methanol fuel at a compression ratio not exceeding 18:1.

17. The process as claimed in claim 14, wherein a gasoline fuel is used at an air to fuel ratio of between 18-30 to one.

* * * * *